United States Patent
Liu et al.

(10) Patent No.: US 10,326,628 B2
(45) Date of Patent: Jun. 18, 2019

(54) SIGNAL PROCESSING METHOD AND APPARATUS, AND DEVICE

(71) Applicant: Huawei Technologies Co., Ltd., Shenzhen, Guangdong (CN)

(72) Inventors: Sheng Liu, Shenzhen (CN); Weishan Lu, Shenzhen (CN); Teyan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 15/493,675

(22) Filed: Apr. 21, 2017

(65) Prior Publication Data

US 2017/0222855 A1    Aug. 3, 2017

Related U.S. Application Data

(63) Continuation of application No. PCT/CN2014/089133, filed on Oct. 22, 2014.

(51) Int. Cl.
| | |
|---|---|
| *H04W 4/00* | (2018.01) |
| *H04L 27/26* | (2006.01) |
| *H04B 7/0452* | (2017.01) |
| *H04W 72/04* | (2009.01) |

(52) U.S. Cl.
CPC ....... *H04L 27/2608* (2013.01); *H04B 7/0452* (2013.01); *H04L 27/26* (2013.01); *H04W 72/0453* (2013.01)

(58) Field of Classification Search
None
See application file for complete search history.

(56) References Cited

U.S. PATENT DOCUMENTS

| | | |
|---|---|---|
| 2013/0177090 A1 | 7/2013 | Yang et al. |
| 2014/0307612 A1 | 10/2014 | Vermani et al. |
| 2014/0314064 A1 | 10/2014 | Park et al. |
| 2017/0222855 A1* | 8/2017 | Liu ......................... H04L 27/26 |

FOREIGN PATENT DOCUMENTS

CN     103947143 A     7/2014

* cited by examiner

*Primary Examiner* — Phuongchau Ba Nguyen

(57) ABSTRACT

Embodiments of the present application provide a signal processing method and apparatus, and a device. The embodiments relate to an MU-MIMO system. The signal processing apparatus includes: a signal obtaining module and a sending module. A signal includes N spatial flows, and the signal includes a training field, where the training field includes a first part and a second part. Sub-carriers of an OFDM symbol in the second part of the training field are divided into N training sub-carrier sets TSSs in a division manner that is the same as a division manner of sub-carriers of an OFDM symbol in the first part of the training field, and each spatial flow corresponds to at least one sub-carrier in a TSS, in each frequency domain location, of each OFDM symbol in the second part of the training field. So that precision of the channel estimation is improved.

8 Claims, 7 Drawing Sheets

SIGNAL PROCESSING METHOD AND APPARATUS, AND DEVICE

CROSS-REFERENCE TO RELATED APPLICATIONS

This application is a continuation of International Application No. PCT/CN2014/089133, filed on Oct. 22, 2014, the disclosure of which is hereby incorporated by reference in its entirety.

TECHNICAL FIELD

Embodiments of the present invention relate to the wireless communications technologies, and in particular, to a signal processing method and apparatus, and a device.

BACKGROUND

Uplink multi-user multiple-input multiple-output (MU-MIMO) is a key technology of the new-generation wireless local area network (WLAN) standard 802.11ax. In the uplink MU-MIMO, an access point (AP) obtains channel estimation of the uplink MU-MIMO by using a high efficiency long training field (HE-LTF) in an uplink packet transmitted by each STA, to demodulate signals from different stations (STA).

FIG. 1 is an exemplary diagram of a training field solution using sub-carrier or sub-band interleaving in the prior art. As shown in FIG. 1, a training field includes 4+1 orthogonal frequency division multiplexing (OFDM) symbols. The training field is divided into two parts according to functions. A first part includes the first four OFDM symbols, that is, an LTF-1, an LTF-2, an LTF-3, and an LTF-4, and a second part includes a fifth OFDM symbol, that is, an additional LTF. Sub-carriers of each OFDM symbol in the first part of the training field each carry a known reference symbol. Four spatial flows sequentially correspond to different sub-carriers or sub-bands in each OFDM symbol, and have locations that do not overlap with those of corresponding sub-carriers or sub-bands of corresponding spatial flows in an adjacent OFDM symbol. A sub-carrier or sub-band corresponding to each spatial flow repeats every four sub-carriers or sub-bands, and after four OFDM symbols, each spatial flow traverses all sub-carriers, but sub-carriers corresponding to the spatial flows are orthogonal to each other. In this way, by using a known reference symbol carried by sub-carriers corresponding to each spatial flow, channel estimation of the corresponding spatial flow on each sub-carrier can be obtained.

In the prior art shown in FIG. 1, the additional LTF in the second part of the training field is a repetition of the LTF-1 in the first part of the training field, and is mainly used to estimate a carrier frequency offset (CFO) corresponding to each spatial flow, so as to compensate for a phase offset caused due to the CFO during channel estimation. However, channel estimation obtained by using the prior art is of low precision, and estimation performance is relatively poor.

SUMMARY

Embodiments of the present invention provide a signal processing method and apparatus, and a device, to improve precision of channel estimation and improve estimation performance.

According to a first aspect, an embodiment of the present invention provides a signal processing apparatus, applied to a multi-user multiple-input multiple-output MU-MIMO system, and including:

a signal obtaining module, configured to obtain a signal including N spatial flows, where the signal includes a training field, and the training field includes a first part and a second part, where the first part of the training field includes L orthogonal frequency division multiplexing OFDM symbols, L≤N is a positive integer, sub-carriers of the OFDM symbol in the first part of the training field are divided into N training sub-carrier sets TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field; and a sending module, configured to send the signal obtained by the signal obtaining module to a receive end.

With reference to the first aspect, in a first possible implementation manner of the first aspect, in the OFDM symbol in the second part of the training field, each TSS includes N sub-carrier groups, and each spatial flow corresponds to at least one sub-carrier in at least one sub-carrier group of each TSS.

With reference to the first aspect, in a second possible implementation manner of the first aspect, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

With reference to the second possible implementation manner of the first aspect, in a third possible implementation manner of the first aspect, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

With reference to the first aspect, in a fourth possible implementation manner of the first aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

With reference to the first aspect, in a fifth possible implementation manner of the first aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the M spatial flows each correspond to at least one sub-carrier in at least one sub-carrier array of each TSS combination.

According to a second aspect, an embodiment of the present invention provides user equipment, applied to a multi-user multiple-input multiple-output MU-MIMO system, and including the signal processing apparatus according to any implementation manner of the first aspect.

According to a third aspect, an embodiment of the present invention provides a signal processing apparatus, applied to a multi-user multiple-input multiple-output MU-MIMO system, and including:

a receiving module, configured to receive a signal including N spatial flows, where the signal includes a training field, and the training field includes a first part and a second part, where the first part of the training field includes L orthogonal frequency division multiplexing OFDM symbols, L≤N is a positive integer, sub-carriers of the OFDM symbol in the first part of the training field are divided into N training sub-carrier sets TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field;

an obtaining module, configured to obtain, for each spatial flow in the signal received by the receiving module, a phase correction factor corresponding to the spatial flow; and a correction module, configured to perform phase correction on channel estimation of the spatial flow by using the phase correction factor obtained by the obtaining module, to obtain phase-corrected channel estimation of each spatial flow.

With reference to the third aspect, in a first possible implementation manner of the third aspect, in the OFDM symbol in the second part of the training field, each TSS includes N sub-carrier groups, and each spatial flow corresponds to at least one sub-carrier in at least one sub-carrier group of each TSS.

With reference to the third aspect, in a second possible implementation manner of the third aspect, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

With reference to the second possible implementation manner of the third aspect, in a third possible implementation manner of the third aspect, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

With reference to the third aspect, in a fifth possible implementation manner of the third aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the groups of spatial flows are respectively mapped to the sub-carrier arrays of each TSS combination by using an M×M-dimensional spatial flow mapping matrix P.

With reference to the third aspect, in a fifth possible implementation manner of the third aspect, M is an integer greater than or equal to 2, TSSs, in a same location, of all OFDM symbols in the second part of the training field constitute one TSS combination, each TSS combination includes $\frac{N}{M}$ sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $\frac{N}{M}$ groups, where each group includes M spatial flows, and the M spatial flows each correspond to at least one sub-carrier in at least one sub-carrier array of each TSS combination.

With reference to the third aspect or any one of the first to the fifth possible implementation manners of the third aspect, in a sixth possible implementation manner of the third aspect, the obtaining module is specifically configured to:

obtain, for each spatial flow according to the following formula, the phase correction factor corresponding to the spatial flow:

$$\Delta\phi_{m,n} = \sum_{k \in \pi_{m,n}} \angle[H_{m,L+1}(k)H_{m,n}^*(k)],$$

where n=1, 2, ..., L, and m=1, 2, ..., N where in the foregoing formula, $\Delta\phi_{m,n}$ represents a phase correction factor, corresponding to an $n^{th}$ spatial flow, of an $n^{th}$ OFDM symbol in the first part of the training field; $H_{m,n}(k)$ is first channel estimation, obtained by using the $n^{th}$ OFDM symbol in the first part of the training field, of the $m^{th}$ spatial flow; $H_{m,L+1}(k)$ is second channel estimation, obtained by using the second part of the training field, of the $m^{th}$ spatial flow; $\pi_{m,n}$ is a set of numbers of sub-carriers in a sub-carrier group that corresponds to the $m^{th}$ spatial flow and that is in a TSS or TSS combination in a corresponding location in the second part of the training field, where the TSS or TSS combination in the corresponding location is a TSS or TSS combination that is the same as a TSS that corresponds to the $m^{th}$ spatial flow and that is in the $n^{th}$ OFDM symbol in the first part of the training field; the operator $\angle$ represents obtaining a phase angle of a corresponding complex number; $\Sigma$ represents a summation operation; * represents a conjugate operation; and j represents a unit of the complex number.

With reference to the sixth possible implementation manner of the third aspect, in a seventh possible implementation manner of the third aspect, the correction module is specifically configured to:

for m=1, 2, ..., N, separately calculate $H_{m,n}(k)e^{j\Delta\phi_{m,n}}$ n=1, 2, ..., L) to obtain L phase-corrected channel estimation segments of the $m^{th}$ spatial flow, where $H_{m,n}(k)$ is first channel estimation, obtained by using the $n^{th}$ OFDM symbol in the first part of the training field, of the $m^{th}$ spatial flow, and $\Delta\phi_{m,n}$ is the phase correction factor, corresponding to the $m^{th}$ spatial flow, of the $n^{th}$ OFDM symbol in the first part of the training field; and combine, for each spatial flow, L phase-corrected channel estimation segments of the spatial flow, to obtain the phase-corrected channel estimation of the spatial flow.

According to a fourth aspect, an embodiment of the present invention provides an access point device, applied to a multi-user multiple-input multiple-output MU-MIMO system, and including the signal processing apparatus according to any implementation manner of the third aspect.

According to a fifth aspect, an embodiment of the present invention provides a signal processing method, applied to a multi-user multiple-input multiple-output MU-MIMO system, and including:

obtaining a signal including N spatial flows, where the signal includes a training field, and the training field includes a first part and a second part, where the first part of the training field includes L orthogonal frequency division multiplexing OFDM symbols, L≤N, N is a positive integer, sub-carriers of the OFDM symbol in the first part of the training field are divided into N training sub-carrier sets TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field; and sending the signal to a receive end.

With reference to the fifth aspect, in a first possible implementation manner of the fifth aspect, in the OFDM symbol in the second part of the training field, each TSS includes N sub-carrier groups, and each spatial flow corresponds to at least one sub-carrier in at least one sub-carrier group of each TSS.

With reference to the fifth aspect, in a second possible implementation manner of the fifth aspect, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

With reference to the second possible implementation manner of the fifth aspect, in a third possible implementation manner of the fifth aspect, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

With reference to the fifth aspect, in a fourth possible implementation manner of the fifth aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

With reference to the fifth aspect, in a fifth possible implementation manner of the fifth aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the M spatial flows each correspond to at least one sub-carrier in at least one sub-carrier array of each TSS combination.

According to a sixth aspect, an embodiment of the present invention provides a signal processing method, applied to a multi-user multiple-input multiple-output MU-MIMO system, and including:

receiving a signal including N spatial flows, where the signal includes a training field, and the training field includes a first part and a second part, where the first part of the training field includes L orthogonal frequency division multiplexing OFDM symbols, L≤N, N is a positive integer, sub-carriers of the OFDM symbol in the first part of the training field are divided into N training sub-carrier sets TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field;

obtaining, for each spatial flow, a phase correction factor corresponding to the spatial flow; and performing, by using the phase correction factor, phase correction on channel estimation of the spatial flow corresponding to the phase correction factor, to obtain phase-corrected channel estimation of each spatial flow.

With reference to the sixth aspect, in a first possible implementation manner of the sixth aspect, in the OFDM symbol in the second part of the training field, each TSS includes N sub-carrier groups, and each spatial flow corresponds to at least one sub-carrier in at least one sub-carrier group of each TSS.

With reference to the sixth aspect, in a second possible implementation manner of the sixth aspect, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

With reference to the second possible implementation manner of the sixth aspect, in a third possible implementation manner of the sixth aspect, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

With reference to the sixth aspect, in a fourth possible implementation manner of the sixth aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

With reference to the sixth aspect, in a fifth possible implementation manner of the sixth aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field includes:

all the spatial flows are divided into $$\frac{N}{M}$$

groups, where each group includes M spatial flows, and the M spatial flows each correspond to at least one sub-carrier in at least one sub-carrier array of each TSS combination.

With reference to the sixth aspect or any one of the first to the fifth possible implementation manners of the sixth aspect, in a sixth possible implementation manner of the sixth aspect, the obtaining, for each spatial flow, a phase correction factor corresponding to the spatial flow includes:

obtaining, for each spatial flow according to the following formula, the phase correction factor corresponding to the spatial flow:

$$\Delta\phi_{m,n} = \sum_{k \in \pi_{m,n}} \angle[H_{m,L+1}(k)H^*_{m,n}(k)],$$

where n=1, 2, . . . , L and m=1, 2, . . . , N where in the foregoing formula, $\Delta\phi_{m,n}$ represents a phase correction factor, corresponding to an $m^{th}$ spatial flow, of an $n^{th}$ OFDM symbol in the first part of the training field; $H_{m,n}(k)$ is first channel estimation, obtained by using the $n^{th}$ OFDM symbol in the first part of the training field, of the $m^{th}$ spatial flow; $H_{m,L+1}(k)$ is second channel estimation, obtained by using the second part of the training field, of the $m^{th}$ spatial flow; $\pi_{m,n}$ is a set of numbers of sub-carriers in a sub-carrier group that corresponds to the $m^{th}$ spatial flow and that is in a TSS or TSS combination in a corresponding location in the second part of the training field, where the TSS or TSS combination in the corresponding location is a TSS or TSS combination that is the same as a TSS that corresponds to the $m^{th}$ spatial flow and that is in the $n^{th}$ OFDM symbol in the first part of the training field; the operator ∠ represents obtaining a phase angle of a corresponding complex number; Σ represents a summation operation; * represents a conjugate operation; and j represents a unit of the complex number.

With reference to the sixth possible implementation manner of the sixth aspect, in a seventh possible implementation manner of the sixth aspect, the performing, by using the phase correction factor, phase correction on channel estimation of the spatial flow corresponding to the phase correction factor, to obtain phase-corrected channel estimation of each spatial flow includes:

for m=1, 2, . . . , N, separately calculating $H_{m,n}(k)e^{j\Delta\phi_{m,n}}$ n=1, 2, . . . , L) to obtain L phase-corrected channel estimation segments of the $m^{th}$ spatial flow, where $H_{m,n}(k)$ is first channel estimation, obtained by using the $n^{th}$ OFDM symbol in the first part of the training field, of the $m^{th}$ spatial flow, and $\Delta\phi_{m,n}$ is the phase correction factor, corresponding to the $m^{th}$ spatial flow, of the $n^{th}$ OFDM symbol in the first part of the training field; and combining, for each spatial flow, L phase-corrected channel estimation segments of the spatial flow, to obtain the phase-corrected channel estimation of the spatial flow.

According to a seventh aspect, an embodiment of the present invention provides a signal, where the signal is a signal including N spatial flows, the signal includes a training field, and the training field includes a first part and a second part, where the first part of the training field includes L orthogonal frequency division multiplexing OFDM symbols, L≤N, N is a positive integer, sub-carriers of the OFDM symbol in the first part of the training field are divided into N training sub-carrier sets TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field.

With reference to the seventh aspect, in a first possible implementation manner of the seventh aspect, in the OFDM symbol in the second part of the training field, each TSS includes N sub-carrier groups, and each spatial flow corresponds to at least one sub-carrier in at least one sub-carrier group of each TSS.

With reference to the seventh aspect, in a second possible implementation manner of the seventh aspect, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

With reference to the second possible implementation manner of the seventh aspect, in a third possible implementation manner of the seventh aspect, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

With reference to the seventh aspect, in a fourth possible implementation manner of the seventh aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field is specifically:

all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

With reference to the seventh aspect, in a fifth possible implementation manner of the seventh aspect, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction; and that each spatial flow corresponds to at least one sub-carrier in each TSS of each OFDM symbol in the second part of the training field is specifically:

all the spatial flows are divided into $$\frac{N}{M}$$

groups, where each group includes M spatial flows, and the M spatial flows each correspond to at least one sub-carrier in at least one sub-carrier array of each TSS combination.

In the embodiments of the present invention, sub-carriers of an OFDM symbol in a second part of a training field are divided into N TSSs in a division manner that is the same as a division manner of sub-carriers of an OFDM symbol in a first part of the training field, and each spatial flow corresponds to at least one sub-carrier in a TSS, in each frequency domain location, of the OFDM symbol in the second part of the training field. By means of a structure of the second part of the training field in the embodiments of the present invention, phase correction is effectively performed on channel estimation that is obtained in another OFDM symbol in the first part of the training field, so that precision of the channel estimation is improved and estimation performance is improved.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
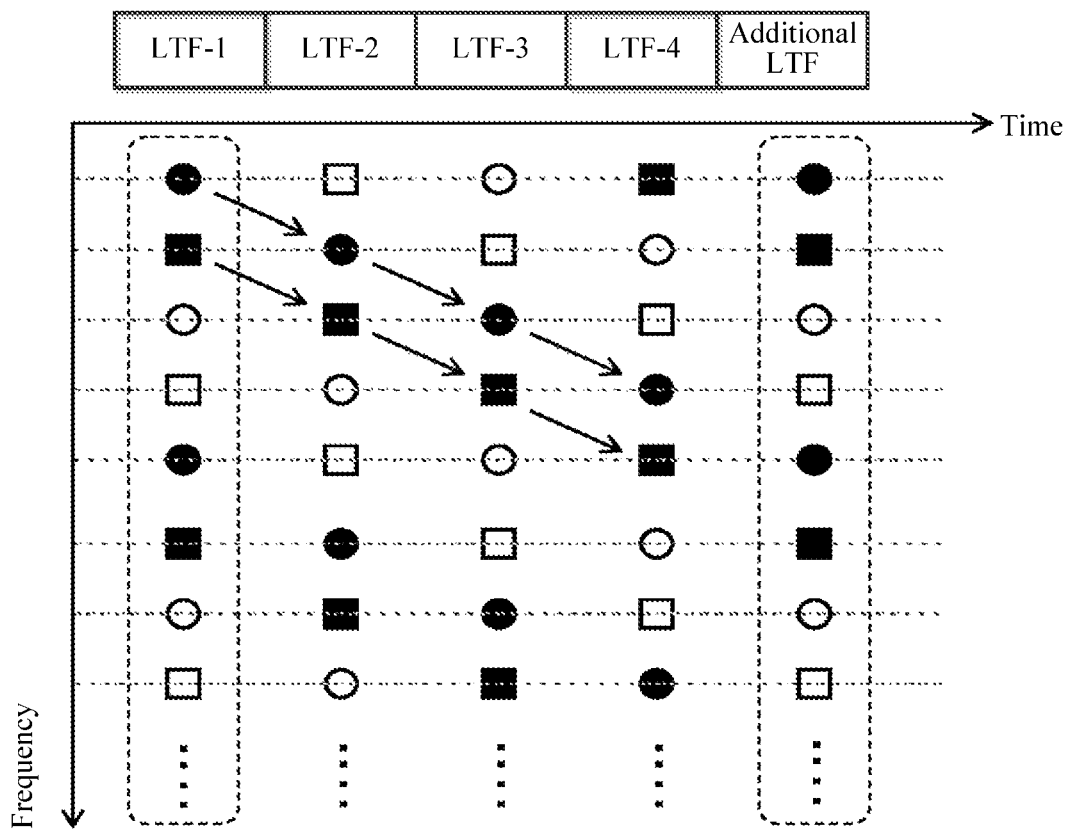
FIG. 1 is an exemplary diagram of a training field solution using sub-carrier or sub-band interleaving in the prior art.

In a structure shown in FIG. 1, a second part of a training field, that is, an additional LTF, is a direct repetition of a part of OFDM symbols in a first part of the training field. Typically, as shown in FIG. 1, the second part of the training field is a direct repetition of a first OFDM symbol LTF-1, and is mainly used to estimate a CFO corresponding to each spatial flow, so as to compensate for a phase offset caused due to the CFO during channel estimation.

It should be noted that in any accompanying drawing in the present invention, a solid circle "●" is used to represent a first spatial flow, a solid square "■" is used to represent a second spatial flow, a hollow circle "○" is used to represent a third spatial flow, and a hollow square "□" is used to represent a fourth spatial flow.

Specifically, with respect to the LTF-1, a phase offset of a subsequent $n^{th}$ OFDM symbol that is caused by an $m^{th}$ spatial flow due to a CFO is $\Delta\phi_m = 2\pi n T \Delta f_m$, n=1, 2, ..., L, where T is a length of the OFDM symbol, and $\Delta f_m$ is the CFO corresponding to the $m^{th}$ spatial flow. According to a structure of the first part of the training field shown in FIG. 1, each spatial flow has only 1/L corresponding sub-carriers in one OFDM symbol; therefore, channel estimation of each spatial flow is obtained by means of combination after 1/L corresponding sub-carriers of each of L OFDM symbols: the LTF-1, an LTF-2, ..., and an LTF-L are obtained. In this case, L=4. In this way, channel estimation, obtained in an LTF-n, of the $m^{th}$ spatial flow may be expressed as:

$$H_{m,n}(k) = H_m(k) e^{j2\pi(n-1)T\Delta f_m}, \text{ where } k \in \Omega_{m,n} \quad (1).$$

$H_m(k)$ is the channel estimation of the $m^{th}$ spatial flow, and $\Omega_{m,n}$ is a set of numbers of all sub-carriers in the LTF-n that belong to the $m^{th}$ spatial flow. Because the additional LTF is a repetition of the LTF-1, that is $\Omega_{m,L+1} = \Omega_{m,1}$, there is only one phase offset between channel estimation $H_{m,1}(k) = H_m(k)$, obtained in the additional LTF, of the $m^{th}$ spatial flow and channel estimation $H_{m,L+1}(k) = H_m(k)e^{j2\pi LT\Delta f_m}$, obtained in the LTF-1, of the $m^{th}$ spatial flow, where $k \in \Omega_{m,1}$. Therefore, it can be obtained that CFO estimation of the $m^{th}$ spatial flow is:

$$\Delta f_m = \frac{1}{2\pi LT} \sum_{k \in \Omega_{m,1}} \angle[H_{m,L+1}(k) H_{m,1}^*(k)]. \quad (2)$$

The operator $\angle$ represents obtaining a phase angle of a corresponding complex number. Once $\Delta f_m$ is estimated, the channel estimation of the $m^{th}$ spatial flow may be obtained by performing frequency offset compensation according to the formula (1).

A WLAN is a half-duplex system, that is, only receiving or only transmission is supported at a same time, and receiving and transmission cannot be performed simultaneously. In uplink MU-MIMO, when a STA is switched from a receive state, for example, a state of receiving a downlink frame including scheduling control information, to a transmit state, a current consumed by a radio frequency circuit suddenly increases, which causes a frequency fluctuation of a voltage-controlled oscillator (VCO) including a radio frequency carrier.

Typically, due to a fluctuation of a transmitting carrier frequency of a STA, in initial dozens of microseconds (us) after the start of uplink transmission, a CFO fluctuates within a range of ±1 kilohertz (KHz). After 70 us to 100 us, a fluctuation range drops to 500 hertz (Hz) or below and gradually tends to be stable. The training field is a part of a physical-layer packet preamble, and is located in an area in which a CFO fluctuates relatively much. Moreover, when there are a relatively large quantity of spatial flows, each OFDM symbol in the training field has a relatively obvious phase offset caused by carrier phase noise.

Therefore, the channel estimation, obtained in the LTF-n, of the $m^{th}$ spatial flow is corrected as:

$$H_{m,n}(k) = H_m(k) e^{j[2\pi \Delta f_m(nT) + \varphi_m(nT)]}, k \in \Omega_{m,n}, n=1, 2, \ldots, L \quad (3).$$

That is, a CFO of each OFDM symbol changes with respect to different spatial flows, and includes a random phase offset caused by carrier phase noise. In this way, if the training field solution shown in FIG. 1 is used, CFO or phase offset estimation corresponding to another OFDM symbol in the first part of the training field cannot be obtained.

Based on the foregoing descriptions, the embodiments of the present invention provide a signal processing method and apparatus, and a device, which use a structure different from that of a second part of a training field in the prior art. In the embodiments of the present invention, sub-carriers of an OFDM symbol in a second part of a training field are divided into N TSSs in a division manner that is the same as a division manner of sub-carriers of an OFDM symbol in a first part of the training field, and each spatial flow corresponds to at least one sub-carrier in a TSS, in each frequency domain location, of the OFDM symbol in the second part of the training field. By means of a structure of the second part of the training field in the embodiments of the present invention, phase correction is effectively performed on channel estimation that is obtained in another OFDM symbol in the first part of the training field, so that precision of the channel estimation is improved and estimation performance is improved. In the embodiments of the present invention, based on the training field solution shown in FIG. 1, the structure of the second part of the training field is improved.

Figure 2:
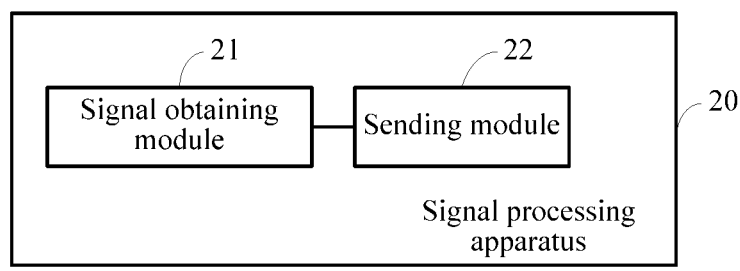
FIG. 2 is a schematic structural diagram of Embodiment 1 of a signal processing apparatus in the present invention.

FIG. 2 is a schematic structural diagram of Embodiment 1 of a signal processing apparatus in the present invention. This embodiment of the present invention provides the signal processing apparatus, applied to an MU-MIMO system. The apparatus may be independently disposed, or may be integrated in user equipment. The user equipment may be a terminal device such as a mobile phone, a portable computer, a tablet computer, a game console, a television, or a telephone set, or even may be a switch, an electrical appliance, or other hardware in a customer location. As shown in FIG. 2, the signal processing apparatus 20 includes: a signal obtaining module 21 and a sending module 22.

The signal obtaining module 21 is configured to obtain a signal including N spatial flows, where the signal includes a training field, and the training field includes a first part and a second part, where the first part of the training field includes L OFDM symbols, L≤N, N is a positive integer, sub-carriers of the OFDM symbol in the first part of the training field are divided into N training sub-carrier sets (TSS), each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field. The sending module 22 is configured to send the signal obtained by the signal obtaining module 21 to a receive end.

It should be noted that in any embodiment of the present invention, the described "obtain" includes a meaning of "generate". That is, the signal including at least one spatial flow is generated by the signal obtaining module 21. Generally, a maximum value of N is 8, which is not limited in the present invention.

Sub-carriers of each OFDM symbol in the first part of the training field are divided into N TSSs in a same manner, and each TSS has a different frequency domain location. The TSS may be a sub-band constituted by consecutive sub-carriers, or may be a sub-carrier sequence sequentially spaced by N−1 sub-carriers. When L=N, sub-carriers corresponding to each spatial flow each traverse all locations. Therefore, by using a known reference symbol that is carried by sub-carriers corresponding to each spatial flow, channel estimation of a corresponding spatial flow on each sub-carrier can be obtained. When L<N, channel estimation of each spatial flow on corresponding sub-carriers in the L OFDM symbols is obtained, and on this basis, channel estimation of each spatial flow on each sub-carrier may be further obtained by means of interpolation.

Sub-carriers of each OFDM symbol in the second part of the training field are divided into N TSSs in a division manner that is the same as a division manner of the sub-carriers of the OFDM symbol in the first part of the training field. Each spatial flow corresponds to at least one sub-carrier in each TSS of the OFDM symbol in the second part of the training field, and each TSS corresponds to at least one OFDM symbol in the second part of the training field.

The sending module 22 sends the foregoing signal to the receive end. Correspondingly, the receive end receiving the foregoing signal may obtain, by using the OFDM symbol included in the second part of the training field, a phase correction factor corresponding to the OFDM symbol in the first part of the training field, and phase offset compensation is effectively performed on channel estimation that is obtained in the OFDM symbol in the first part of the training field, to improve precision of the channel estimation and improve estimation performance.

A process in which the receive end performs channel estimation according to the signal is described in detail in an embodiment of a receive end side.

Several embodiments are used below to describe a difference between signals used for channel estimation in the present invention and in the prior art.

In an optional embodiment, sub-carriers of each OFDM symbol in the second part of the training field are divided into N TSSs in a division manner that is the same as a division manner of the sub-carriers of the OFDM symbol in the first part of the training field. Further, sub-carriers included in each TSS are divided into different levels of sub-carrier groups. For example, a TSS includes ten sub-carriers whose identifiers are 1, 2, 3, . . . , and 10. First, the ten sub-carriers are divided into two first-level sub-carrier groups, a first first-level sub-carrier group includes sub-carriers marked as 1, 2, 3 4, and 5, and a second first-level sub-carrier group includes sub-carriers marked as 6, 7, 8, 9, and 10. Then, the first first-level sub-carrier group is further divided into two second-level sub-carrier groups, a first second-level sub-carrier group includes sub-carriers marked as 1, 2, and 3, and a second second-level sub-carrier group includes sub-carriers marked as 4 and 5. The second first-level sub-carrier group is further divided into two second-level sub-carrier groups, a third second-level sub-carrier group includes sub-carriers marked as 6, 7, and 8, a fourth second-level sub-carrier group includes sub-carriers marked as 9 and 10, and so on.

A description is provided with reference to the foregoing example, and specifically, in the OFDM symbol in the second part of the training field, each TSS includes D levels of sub-carrier groups, where D is a positive integer greater than or equal to 2. A $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group. For example, when a value of D is 2, in the OFDM symbol in the second part of the training field, each TSS includes two levels of sub-carrier groups, where each first-level sub-carrier group further includes N second-level sub-carrier groups, and each spatial flow corresponds to at least one sub-carrier in at least one second-level sub-carrier group included in each first-level sub-carrier group. For different OFDM symbols in the second part of the training field, correspondences between a sub-carrier group and a spatial flow are the same or different. For example, in a structure of a training sequence included in a signal shown in FIG. 5, for two OFDM symbols: an additional LTF-1 and an additional LTF-2, correspondences between a sub-carrier group and a spatial flow are different. In this embodiment, by means of multiple levels of sub-carrier groups, sub-carriers corresponding to each spatial flow are evenly distributed in an entire frequency band, so that a frequency diversity gain may be obtained during phase offset estimation.

Figure 3:
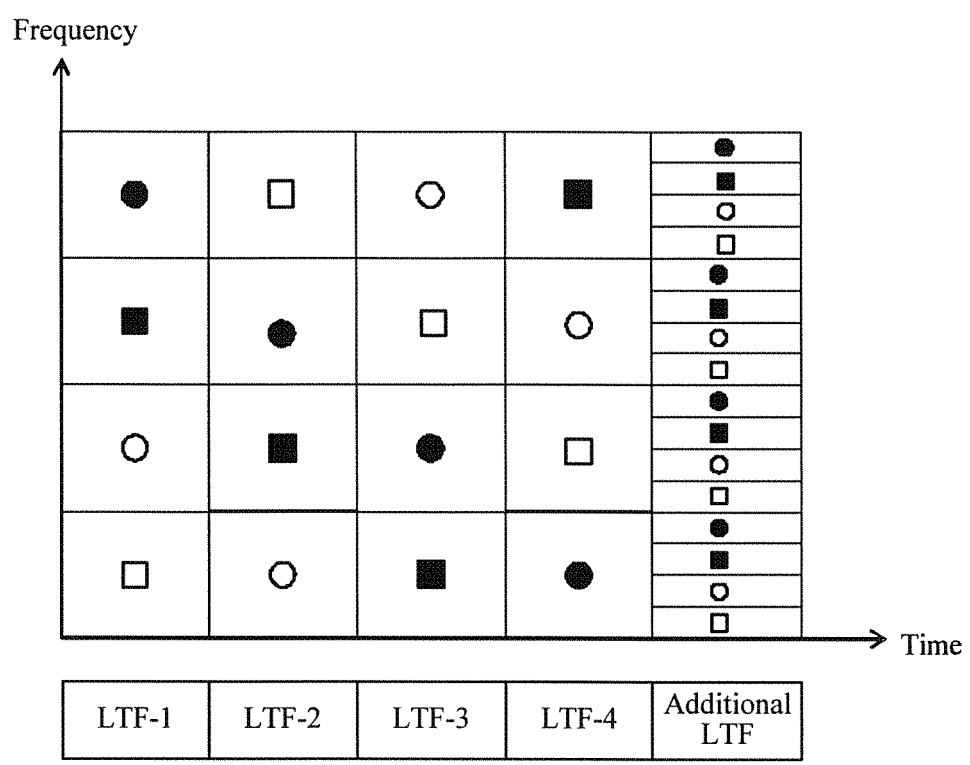
FIG. 3 is a schematic structural diagram of a training sequence included in a signal in the present invention.

In an implementation manner, a value of M is 1, that is, the second part of the training field includes one OFDM symbol, that is, each TSS includes one level of sub-carrier group. In the OFDM symbol in the second part of the training field, each TSS includes N sub-carriers groups, and each spatial flow corresponds to at least one sub-carrier in at least one sub-carrier group of each TSS. As shown in FIG. 3, an LTF-1, an LTF-2, an LTF-3, and an LTF-4 are four OFDM symbols included in the first part of the training field in this implementation manner, which is the same as the solution shown in FIG. 1, and an additional LTF, that is, the OFDM symbol included in the second part of the training field in this implementation manner, is different from the solution shown in FIG. 1. This implementation manner is a special case when the value of M is 1. Certainly, M may also be another value.

Referring to both FIG. 1 and FIG. 3, in a solution shown in FIG. 3, sub-carriers of the additional LTF are divided in a division manner that is the same as a division manner of sub-carriers of the LTF-1, the LTF-2, the LTF-3, and the LTF-4, and an entire frequency band is divided into four TSSs. A location difference of the four TSSs lies in a difference in a sub-carrier frequency, and herein, the four TSSs are represented by four rectangular structures. For each of four OFDM symbols: the LTF-1, the LTF-2, the LTF-3, and the LTF-4, each TSS of four TSSs corresponds to one spatial flow, and the TSSs sequentially do not overlap with each other. Each TSS of the additional LTF is further divided into four sub-carrier groups, each sub-carrier group includes at least one sub-carrier, and each sub-carrier group corresponds to one different spatial flow. A value of a quantity N of the spatial flows is 4, and the four spatial flows each correspond to at least one sub-carrier in each TSS of the additional LTF.

Figure 4:
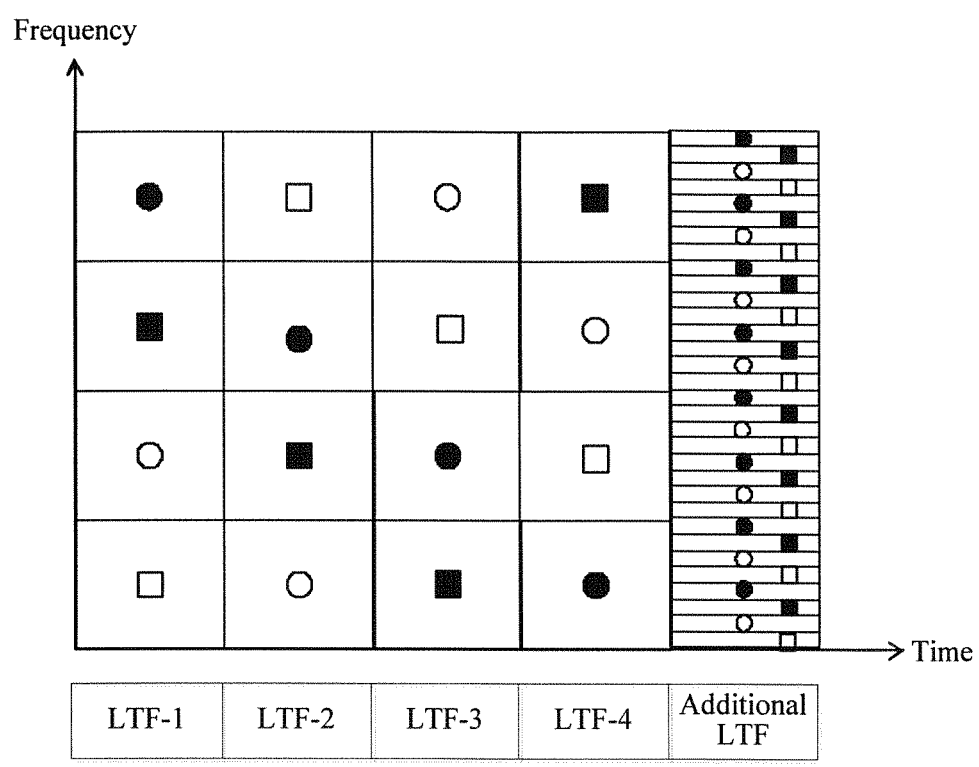
FIG. 4 is another schematic structural diagram of a training sequence included in a signal in the present invention.

In another implementation manner, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer. Each TSS of an additional LTF includes at least K*N sub-carriers, where K is a positive integer greater than 1. As shown in FIG. 4, an LTF-1, an LTF-2, an LTF-3, and an LTF-4 are four OFDM symbols included in the first part of the training field in this implementation manner, which is the same as the solution shown in FIG. 1, and the additional LTF, that is, the OFDM symbol included in the second part of the training field in this implementation manner, is different from the solution shown in FIG.

Referring to both FIG. 1 and FIG. 4, in a solution shown in FIG. 4, sub-carriers of the additional LTF are divided in a division manner that is the same as a division manner of sub-carriers of the LTF-1, the LTF-2, the LTF-3, and the LTF-4 in the solution shown in FIG. 1, and an entire frequency band is divided into four TSSs. A location difference of the four TSSs lies in a difference in a frequency range, and herein, the four TSSs are represented by four rectangular structures. For each of four OFDM symbols: the LTF-1, the LTF-2, the LTF-3, and the LTF-4, one TSS of four TSSs corresponds to one spatial flow, and the TSSs sequentially do not overlap with each other. Each TSS of the additional LTF includes two first-level sub-carrier groups, each first-level sub-carrier group includes at least four second-level sub-carrier groups, each second-level sub-carrier group includes at least one sub-carrier, and each second-level sub-carrier group corresponds to one different spatial flow. Specifically, as shown in FIG. 4, from top to bottom of a frequency axial direction of the additional LTF, every eight small rectangular structures form one TSS; and from top to bottom of each TSS, every four small rectangular structures form one first-level sub-carrier group. The first-level sub-carrier group includes four second-level sub-carrier groups, and each second-level sub-carrier group corresponds to one different spatial flow. A value of a quantity N of the spatial flows is 4, and the four spatial flows each correspond to at least one sub-carrier in each TSS of the additional LTF.

Compared with the embodiment shown in FIG. 3, in the embodiment shown in FIG. 4, each TSS is further divided into two sub-carrier groups, each sub-carrier group is further divided into four sub-carrier subgroups, and each sub-carrier subgroup corresponds to one spatial flow.

In each of the foregoing two implementation manners, a description is provided by using an example in which the value of M is 1. Further, when the value of M is a positive integer greater than 1, for OFDM symbols in the second part of the training field, correspondences between a sub-carrier group and a spatial flow are the same or different. Specifically, if the correspondences are the same, it may be understood that structures of the OFDM symbols in the second part of the training field are the same, for example, the structures shown in FIG. 3 or FIG. 4; or if the correspondences are different, refer to structures shown in FIG. 5.

Figure 5:
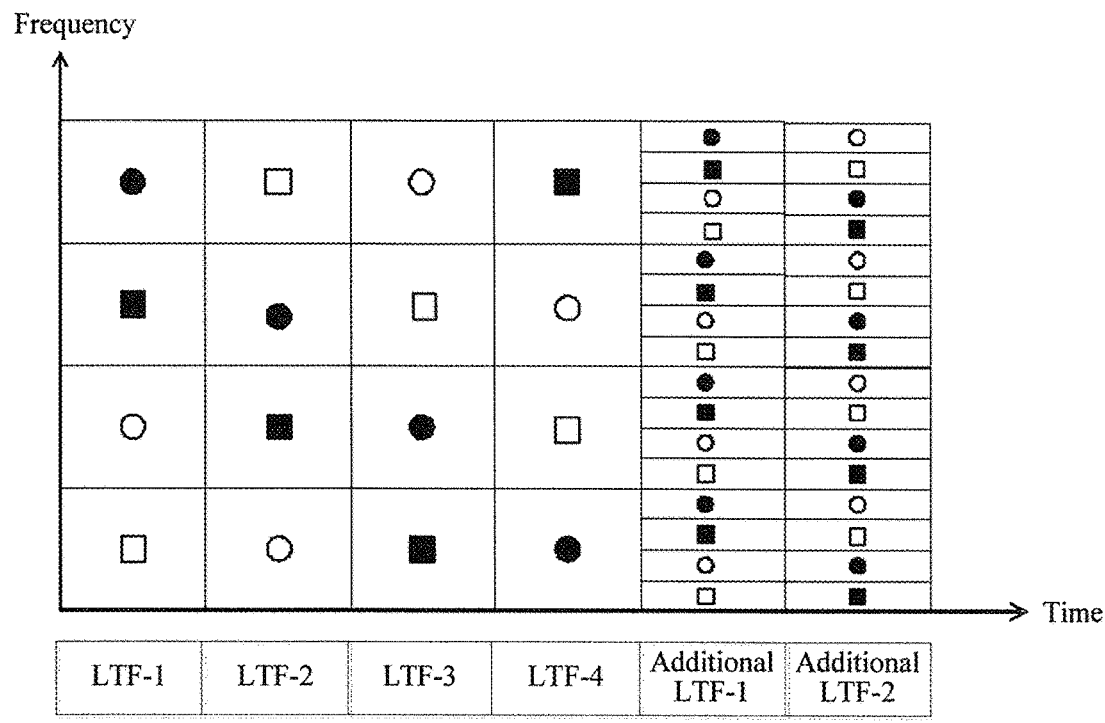
FIG. 5 is still another schematic structural diagram of a training sequence included in a signal in the present invention.

In an example shown in FIG. 5, the value of M is 2, that is, the second part of the training field includes two OFDM symbols, which are separately an additional LTF-1 and an additional LTF-2. The two OFDM symbols have same TSS division and same sub-carrier group division, but correspondences between a sub-carrier group and a spatial flow are different. Sub-carrier groups, whose numbers are 1, 2, 3, and 4 from top to bottom, of one TSS of the additional LTF-1, are in one-to-one correspondence with spatial flows whose numbers are 1, 2, 3, and 4, and sub-carrier groups, whose numbers are 1, 2, 3, and 4 from top to bottom, of one TSS of the additional LTF-2, are in one-to-one correspondence with spatial flows whose numbers are 3, 4, 1, and 2. Generally, a relatively small value is selected for M, for example, M=2, and the additional LTF is located at the end of a training sequence; therefore, a relative phase offset of each additional LTF caused by CFO fluctuation and phase noise may be omitted, and it is considered that channel parameters of additional LTFs are approximately the same.

In another embodiment, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may be specifically: all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P. Optionally, a value of $$\frac{N}{M}$$

is a positive integer, and P is an orthogonal matrix. That is, the TSS of each additional LTF is divided into $$\frac{N}{M}$$

sub-carrier groups, and sub-carrier groups, in a same frequency domain location, of M additional LTFs constitute one sub-carrier array, that is, the sub-carrier array has M sub-carriers in the time domain direction and has at least one sub-carrier in the frequency domain direction. For example, when M=2 or M=4, P may be a matrix in the following form:

when $M = 2$, $$P = \begin{bmatrix} 1 & -1 \\ 1 & 1 \end{bmatrix},$$

or when $M=4$, $$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

Figure 6:
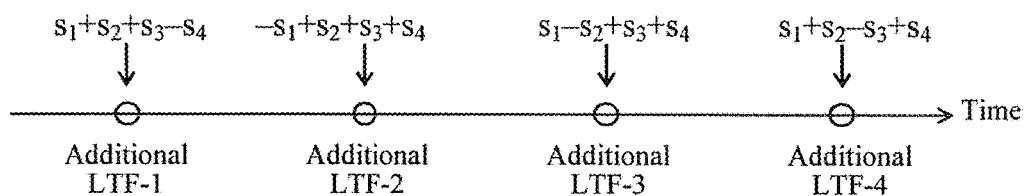
FIG. 6 is an exemplary diagram of mapping a spatial flow to a corresponding sub-carrier array in the present invention.

Specifically, if a group of spatial flows corresponding to a sub-carrier array is expressed in a form of a vector: $s=[s_0, s_1, \ldots, s_{M-1}]^T$, a signal vector of the group of spatial flows after the group of spatial flows are mapped by using a mapping matrix P is: $x=[x_0, x_1, \ldots, x_{M-1}]^T=Ps$. M signal components of the signal vector are mapped to each sub-carrier, in a same frequency domain location, of the M additional LTFs. In this way, the sub-carrier, in the frequency domain location, of each additional LTF carries all M spatial flows of the group of spatial flows. FIG. 6 shows an example in which the foregoing P spatial flow mapping matrix is used when M=4.

Figure 7:
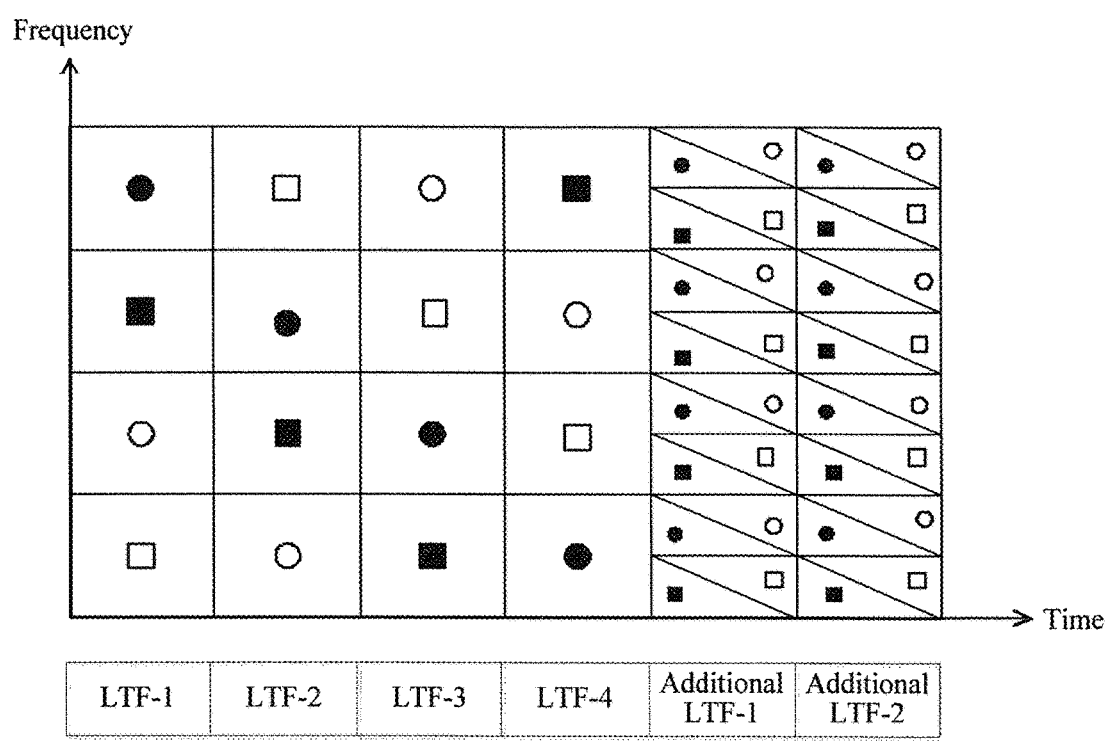
FIG. 7 is yet another schematic structural diagram of a training sequence included in a signal in the present invention.

In an embodiment shown in FIG. 7, there are four spatial flows in total, and an entire frequency band is divided into four TSSs. Four TSSs of each OFDM symbol of the first four OFDM symbols each correspond to one spatial flow, and the TSSs sequentially do not overlap with each other. Fifth and sixth OFDM symbols are additional LTFs, which are separately an additional LTF-1 and an additional LTF-2. Each TSS of the additional LTF-1 and the additional LTF-2 is further divided into two sub-carrier groups, and sub-carrier groups, in a same frequency domain location, of the two additional LTFs constitute one sub-carrier array, which corresponds to two spatial flows. As shown in FIG. 7, TSSs, in a same location, of all the OFDM symbols in the second part of the training field constitute one TSS combination, each TSS combination includes two sub-carrier arrays, and the sub-carrier array includes two sub-carriers in a time domain direction and includes two sub-carriers in a frequency domain direction. All the spatial flows are also divided into two groups, each group includes two spatial flows, and the groups of spatial flows are respectively mapped to the two sub-carrier arrays of each TSS combination by using a 2×2-dimensional spatial flow mapping matrix P. That is, the TSS of each additional LTF is divided into two sub-carrier groups, and sub-carrier groups, in a same frequency domain location, of the two additional LTFs constitute one sub-carrier array, that is, the sub-carrier array has two sub-carriers in the time domain direction and has at least one sub-carrier in the frequency domain direction.

In still another embodiment, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may be specifically: all the spatial flows are divided into $$\frac{N}{M}$$

groups, where each group includes M spatial flows, and the M spatial flows each correspond to at least one sub-carrier in at least one sub-carrier array of each TSS combination. Optionally, a value of $$\frac{N}{M}$$

is a positive integer. That is, the TSS of each additional LTF is divided into $$\frac{N}{M}$$

sub-carrier groups, and sub-carrier groups, in a same frequency domain location, of the M additional LTFs constitute one sub-carrier array, that is, the sub-carrier array has M sub-carriers in the time domain direction and has at least one sub-carrier in the frequency domain direction.

Figure 8:
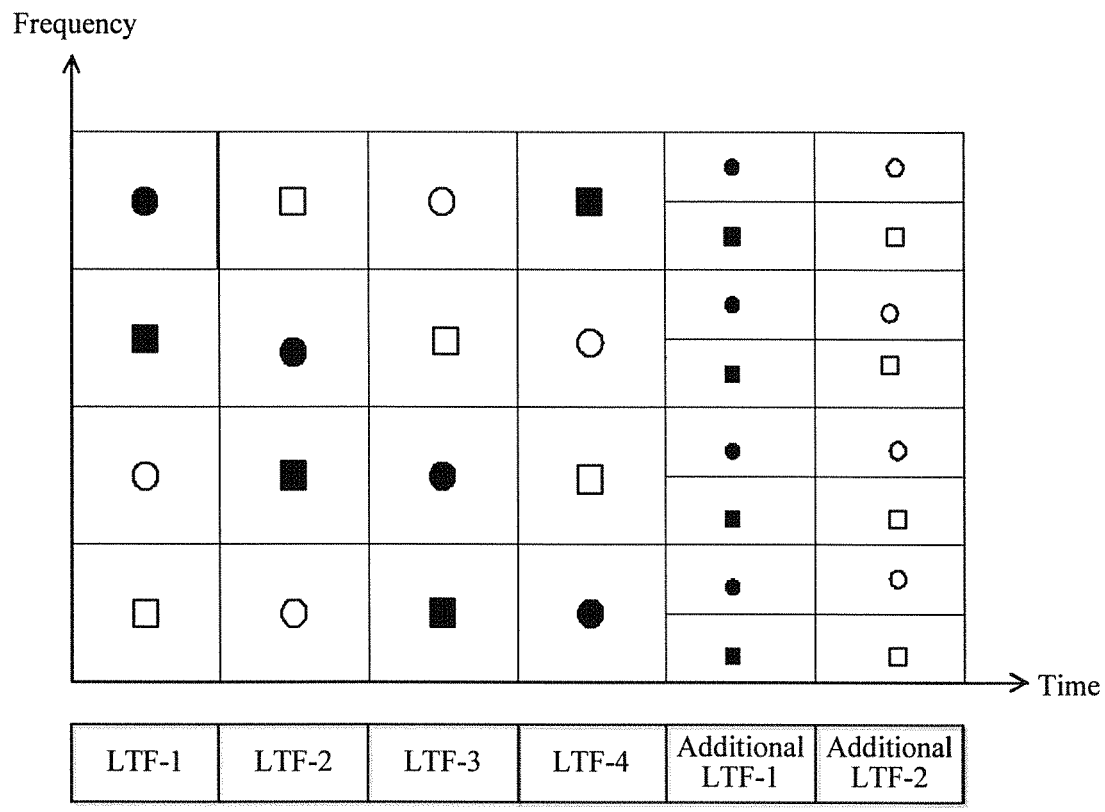
FIG. 8 is yet another schematic structural diagram of a training sequence included in a signal in the present invention.

In an embodiment shown in FIG. 8, there are four spatial flows in total, and an entire frequency band is divided into four TSSs. Four TSSs of each OFDM symbol of previous four OFDM symbols each correspond to one spatial flow, and the TSSs sequentially do not overlap with each other. Fifth and sixth OFDM symbols are additional LTFs, which are separately an additional LTF-1 and an additional LTF-2. Each TSS of the additional LTF-1 and the additional LTF-2 is further divided into two sub-carrier groups, where two sub-carrier groups of the additional LTF-1 correspond to spatial flows whose numbers are 1 and 2, and two sub-carrier groups of the additional LTF-2 correspond to spatial flows whose numbers are 3 and 4. As shown in FIG. 8, TSSs, in a same location, of all the OFDM symbols in the second part of the training field constitute one TSS combination, each TSS combination includes two sub-carrier arrays, and the sub-carrier array includes two sub-carriers in a time domain direction and includes at least one sub-carrier in a frequency domain direction. All the spatial flows are also divided into two groups, each group includes two spatial flows, and the two spatial flows each correspond to at least one sub-carrier in at least one sub-carrier array of each TSS combination. That is, the TSS of each additional LTF is divided into two sub-carrier groups, and sub-carrier groups, in a same frequency domain location, of the two additional LTFs constitute one sub-carrier array, that is, the sub-carrier array has two sub-carriers in the time domain direction and has at least one sub-carrier in the frequency domain direction.

An embodiment of the present invention further provides user equipment, applied to an MU-MIMO system. The user equipment includes the apparatus shown in FIG. 2. The user equipment may be a terminal device such as a mobile phone, a portable computer, a tablet computer, a game console, a television, or a telephone set, or even may be a switch, an electrical appliance, or other hardware in a customer location.

Figure 9:
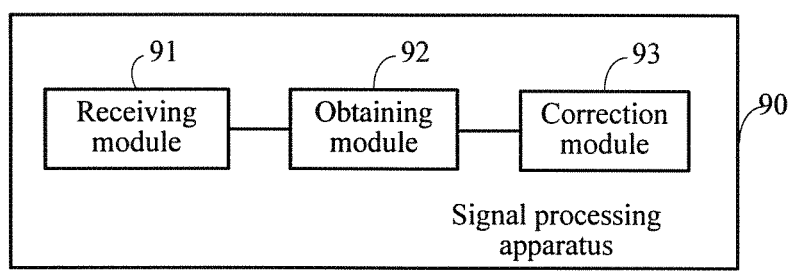
FIG. 9 is a schematic structural diagram of Embodiment 2 of a signal processing apparatus in the present invention.

FIG. 9 is a schematic structural diagram of Embodiment 2 of a signal processing apparatus in the present invention. This embodiment of the present invention provides the signal processing apparatus, applied to an MU-MIMO system. The apparatus may be independently disposed, or may be integrated in a wireless access point or an access point device such as a wireless router, where the wireless router may include a wireless gateway, a wireless bridge, or the like. As shown in FIG. 9, the signal processing apparatus 90 includes: a receiving module 91, an obtaining module 92, and a correction module 93.

The receiving module 91 is configured to receive a signal including N spatial flows, where the signal includes a training field, and the training field includes a first part and a second part, where the first part of the training field includes L OFDM symbols, L≤N, N is a positive integer, sub-carriers of the OFDM symbol in the first part of the training field are divided into N training sub-carrier sets (TSS), each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field. The obtaining module 92 is configured to obtain, for each spatial flow in the signal received by the receiving module 91, a phase correction factor corresponding to the spatial flow. The correction module 93 is configured to perform phase correction on channel estimation of the spatial flow by using the phase correction factor obtained by the obtaining module 92, to obtain phase-corrected channel estimation of each spatial flow.

The signal processing apparatus 90 is disposed in correspondence with the signal processing apparatus 20 shown in FIG. 2, where the signal processing apparatus 20 is a signal sending end, and the signal processing apparatus 90 is a signal receiving end. The signal processing apparatus 90 receives a signal sent by the signal processing apparatus 20; therefore, the signal in this embodiment is the same as the signal sent by the foregoing signal sending end.

In this embodiment of the present invention, by using the OFDM symbol included in the second part of the training field, a phase correction factor corresponding to the OFDM symbol in the first part of the training field is obtained, and phase correction is effectively performed on channel estimation that is obtained in the OFDM symbol in the first part of the training field, to improve precision of the channel estimation and improve estimation performance.

In this embodiment of the signal receiving end, the signal is described briefly herein, and for detailed descriptions, refer to the signal sending end.

In the foregoing embodiment, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group. For different OFDM symbols in the second part of the training field, correspondences between a sub-carrier group and a spatial flow are the same or different. For example, in a structure of a training sequence included in a signal shown in FIG. 5, for two OFDM symbols: an additional LTF-1 and an additional LTF-2, correspondences between a sub-carrier group and a spatial flow are different.

In an implementation manner, in the OFDM symbol in the second part of the training field, each TSS includes N sub-carrier groups, and each spatial flow corresponds to at least one sub-carrier in at least one sub-carrier group of each TSS.

In another implementation manner, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

In still another implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may be specifically: all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P. Optionally, a value of $$\frac{N}{M}$$

is a positive integer, and P is an orthogonal matrix.

In yet another implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may be specifically: all the spatial flows are divided into $$\frac{N}{M}$$

groups, where each group includes M spatial flows, and the M spatial flows each correspond to at least one sub-carrier in at least one sub-carrier array of each TSS combination. Optionally, a value of $$\frac{N}{M}$$

is a positive integer.

Channel estimation performed by using the foregoing signal is described below.

The obtaining module 92 is specifically configured to: obtain, for each spatial flow according to the following formula, the phase correction factor corresponding to the spatial flow:

$$\Delta\phi_{m,n} = \sum_{k \in \pi_{m,n}} \angle[H_{m,L+1}(k)H^*_{m,n}(k)],$$

where n=1, 2, . . . , L and m=1, 2, . . . , N.

In the foregoing formula, $\Delta\phi_{m,n}$ represents a phase correction factor, corresponding to an $m^{th}$ spatial flow, of an $n^{th}$ OFDM symbol in the first part of the training field; $H_{m,n}(k)$ is first channel estimation, obtained by using the $n^{th}$ OFDM symbol in the first part of the training field, of the $m^{th}$ spatial flow; $H_{m,L+1}(k)$ is second channel estimation, obtained by using the second part of the training field, of the $m^{th}$ spatial flow; $\pi_{m,n}$ is a set of numbers of sub-carriers in a sub-carrier group that corresponds to the $m^{th}$ spatial flow and that is in a TSS or TSS combination in a corresponding location in the second part of the training field, where the TSS or TSS combination in the corresponding location is a TSS or TSS combination that is the same as a TSS that corresponds to the $m^{th}$ spatial flow and that is in the $n^{th}$ OFDM symbol in the first part of the training field; the operator ∠ represents obtaining a phase angle of a corresponding complex number; Σ represents a summation operation; * represents a conjugate operation; and j represents a unit of the complex number.

According to the structure of the first part of the training field shown in FIG. 1, each spatial flow corresponds to only 1/L sub-carriers in one OFDM symbol; therefore, channel estimation of each spatial flow is obtained by means of combination after 1/L corresponding sub-carriers of each of L OFDM symbols: the LTF-1, an LTF-2, . . . , and an LTF-L are obtained.

On the basis of the foregoing description, the correction module 93 may be specifically configured to: for m=1, 2, . . . , N, separately calculate $H_{m,n}(k)e^{j\Delta\phi_{m,n}}$ (n=1, 2, . . . , L) to obtain L phase-corrected channel estimation segments of the $m^{th}$ spatial flow, where $H_{m,n}(k)$ is first channel estimation, obtained by using the $n^{th}$ OFDM symbol in the first part of the training field, of the $m^{th}$ spatial flow, and $\Delta\phi_{m,n}$ is the phase correction factor, corresponding to the $m^{th}$ spatial flow, of the $n^{th}$ OFDM symbol in the first part of the training field; and combine, for each spatial flow, L phase-corrected channel estimation segments of the spatial flow, to obtain the phase-corrected channel estimation of the spatial flow.

In this way, by using the foregoing method, phase correction may be performed on L pieces of channel estimation of each spatial flow that are obtained in each TSS of the LTF-1, LTF-2, . . . , and LTF-L, and the L pieces of channel estimation of each spatial flow are combined to obtain phase-corrected channel estimation, on all sub-carriers, of each spatial flow.

Therefore, by means of the training field solution provided in this embodiment of the present invention, a phase correction operation may be effectively performed on L pieces of channel estimation, having different phases, of each spatial flow that are obtained in each of L OFDM symbols in a first part of the training field, so that the pieces of channel estimation of each spatial flow have a same phase. Because neither a CFO nor phase noise needs to be estimated, the pieces of channel estimation of each spatial flow are not affected by CFO fluctuation and the phase noise.

An embodiment of the present invention further provides an access point device, applied to an MU-MIMO system, and including the apparatus shown in FIG. 9. The access point device may be a wireless access point, a wireless router, or the like, where the wireless router may include a wireless gateway, a wireless bridge, or the like.

Figure 10:
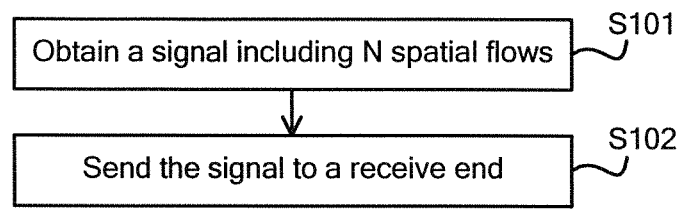
FIG. 10 is a flowchart of Embodiment 1 of a signal processing method in the present invention.

FIG. 10 is a flowchart of Embodiment 1 of a signal processing method in the present invention. This embodiment of the present invention provides the signal processing apparatus, applied to an MU-MIMO system. The method may be executed by a signal processing apparatus, and the apparatus may be independently disposed, or may be integrated in user equipment. The user equipment may be a terminal device such as a mobile phone, a portable computer, a tablet computer, a game console, a television, or a telephone set, or even may be a switch, an electrical appliance, or other hardware in a customer location. As shown in FIG. 10, the signal processing method includes:

S101: Obtain a signal including N spatial flows.

The signal includes a training field, and the training field includes a first part and a second part, where the first part of the training field includes L OFDM symbols, L≤N, N is a positive integer, sub-carriers of the OFDM symbol in the first part of the training field are divided into N TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field.

S102: Send the signal to a receive end.

The signal in this embodiment is the same as the signal in the foregoing embodiments, and details are not described herein again. For detailed descriptions, refer to any one of the foregoing apparatus embodiments.

The method in this embodiment may be executed by the apparatus shown in FIG. 2, and implementation principles and technical solutions thereof are similar, which are not described in detail herein again.

In the foregoing embodiment of the present invention, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

In an optional embodiment, in the OFDM symbol in the second part of the training field, each TSS includes N sub-carrier groups, and each spatial flow corresponds to at least one sub-carrier in at least one sub-carrier group of each TSS.

In another optional embodiment, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

In still another optional embodiment, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may include: all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

In yet another optional embodiment, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may include: all the spatial flows are divided into $$\frac{N}{M}$$

groups, where each group includes M spatial flows, and the M spatial flows each correspond to at least one sub-carrier in at least one sub-carrier array of each TSS combination.

In this embodiment of the present invention, by using an OFDM symbol included in a second part of a training field, a phase correction factor corresponding to an OFDM symbol in a first part of the training field is obtained, and phase correction is effectively performed on channel estimation that is obtained in the OFDM symbol in the first part of the training field, to improve precision of the channel estimation and improve estimation performance.

Figure 11:
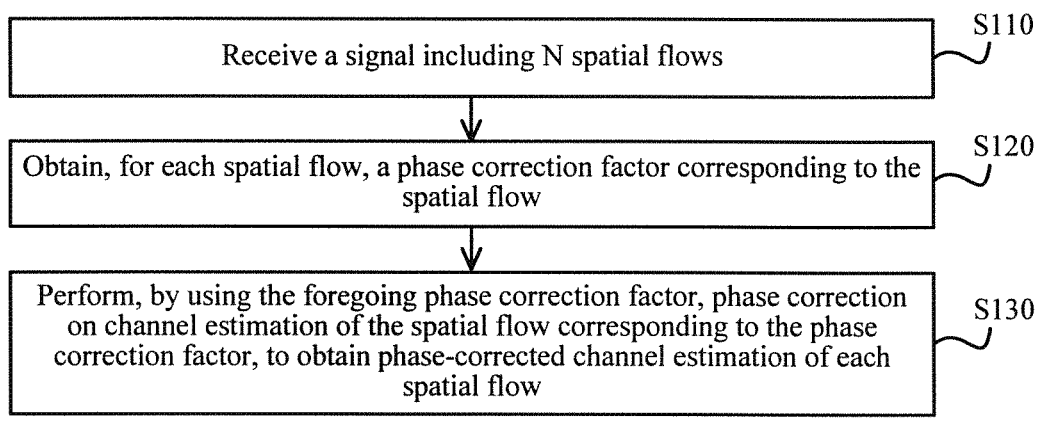
FIG. 11 is a flowchart of Embodiment 2 of a signal processing method in the present invention.

FIG. 11 is a flowchart of Embodiment 2 of a signal processing method in the present invention. This embodiment of the present invention provides the signal processing method, where the method is applied to an MU-MIMO system. The method may be executed by a signal processing apparatus. The apparatus may be independently disposed, or may be integrated in a wireless access point or an access point device such as a wireless router, where the wireless router may include a wireless gateway, a wireless bridge, or the like. As shown in FIG. 11, the signal processing method includes:

S110: Receive a signal including N spatial flows.

Specifically, the signal includes a training field, and the training field includes a first part and a second part, where the first part of the training field includes L OFDM symbols, L≤N, N is a positive integer, sub-carriers of the OFDM symbol in the first part of the training field are divided into N TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field.

S120: Obtain, for each spatial flow, a phase correction factor corresponding to the spatial flow.

S130: Perform, by using the foregoing phase correction factor, phase correction on channel estimation of the spatial flow corresponding to the phase correction factor, to obtain phase-corrected channel estimation of each spatial flow.

The signal in this embodiment is the same as the signal in the foregoing embodiments, and details are not described herein again. For detailed descriptions, refer to any one of the foregoing apparatus embodiments.

The method in this embodiment may be executed by the apparatus embodiment shown in FIG. 9, and implementation principles and technical solutions thereof are similar, which are not described in detail herein again.

In the foregoing embodiment, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

In an optional implementation manner, in the OFDM symbol in the second part of the training field, each TSS includes N sub-carrier groups, and each spatial flow corresponds to at least one sub-carrier in at least one sub-carrier group of each TSS.

In another optional implementation manner, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer.

In still another optional implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may include: all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P.

In yet another optional implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may include: all the spatial flows are divided into $$\frac{N}{M}$$

groups, where each group includes M spatial flows, and the M spatial flows each correspond to at least one sub-carrier in at least one sub-carrier array of each TSS combination.

Optionally, S120 may include: obtaining, for each spatial flow according to the following formula, the phase correction factor corresponding to the spatial flow:

$$\Delta \phi_{m,n} = \sum_{k \in \pi_{m,n}} \angle [H_{m,L+1}(k) H_{m,n}^*(k)],$$

where n=1, 2, . . . , L, and m=1, 2, . . . , N.

In the foregoing formula, $\Delta\phi_{m,n}$ represents a phase correction factor, corresponding to an $m^{th}$ spatial flow, of an $n^{th}$ OFDM symbol in the first part of the training field; $H_{m,n}(k)$ is first channel estimation, obtained by using the $n^{th}$ OFDM symbol in the first part of the training field, of the $m^{th}$ spatial flow; $H_{m,L+1}(k)$ is second channel estimation, obtained by using the second part of the training field, of the $m^{th}$ spatial flow; $\pi_{m,n}$ is a set of numbers of sub-carriers in a sub-carrier group that corresponds to the $m^{th}$ spatial flow and that is in a TSS or TSS combination in a corresponding location in the second part of the training field, where the TSS or TSS combination in the corresponding location is a TSS or TSS combination that is the same as a TSS that corresponds to the $m^{th}$ spatial flow and that is in the $n^{th}$ OFDM symbol in the first part of the training field; the operator $\angle$ represents obtaining a phase angle of a corresponding complex number; Σ represents a summation operation; * represents a conjugate operation; and j represents a unit of the complex number.

Further, S130 may include: for m=1, 2, . . . , N, separately calculating $H_{m,n}(k)e^{j\Delta\phi_{m,n}}$ (n=1, 2, . . . , L) to obtain L phase-corrected channel estimation segments of the $m^{th}$ spatial flow, where $H_{m,n}(k)$ is first channel estimation, obtained by using the $n^{th}$ OFDM symbol in the first part of the training field, of the $m^{th}$ spatial flow, and $\Delta\phi_{m,n}$ is the phase correction factor, corresponding to the $m^{th}$ spatial flow, of the $n^{th}$ OFDM symbol in the first part of the training field; and combining, for each spatial flow, L phase-corrected channel estimation segments of the spatial flow, to obtain the phase-corrected channel estimation of the spatial flow.

In this embodiment of the present invention, by using an OFDM symbol included in a second part of a training field, a phase correction factor corresponding to an OFDM symbol in a first part of the training field is obtained, and phase correction is effectively performed on channel estimation that is obtained in the OFDM symbol in the first part of the training field, to improve precision of the channel estimation and improve estimation performance.

An embodiment of the present invention provides a signal, where the signal is a signal including N spatial flows, the signal includes a training field, and the training field includes a first part and a second part, where the first part of the training field includes L OFDM symbols, L≤N, N is a positive integer, sub-carriers of the OFDM symbol in the first part of the training field are divided into N TSSs, each spatial flow corresponds to one TSS in each OFDM symbol in the first part of the training field, and each spatial flow corresponds to TSSs at different frequency domain locations in different OFDM symbols in the first part of the training field; and the second part of the training field includes M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field.

Optionally, in the OFDM symbol in the second part of the training field, each TSS includes D levels of sub-carrier groups, where D is a positive integer greater than or equal to 2; and a $(D-1)^{th}$-level sub-carrier group includes at least two $D^{th}$-level sub-carrier groups, the $D^{th}$-level sub-carrier group includes at least N sub-carriers, and each spatial flow corresponds to at least one sub-carrier in at least one $D^{th}$-level sub-carrier group included in each $(D-1)^{th}$-level sub-carrier group.

A structure of the signal is described below by using an example.

In an implementation manner, in the OFDM symbol in the second part of the training field, each TSS includes N sub-carrier groups, and each spatial flow corresponds to at least one sub-carrier in at least one sub-carrier group of each TSS. For this implementation manner, refer to a structure shown in FIG. 3.

In another implementation manner, a value of M is 1; a value of D is 2; and in the OFDM symbol in the second part of the training field, each TSS includes K first-level sub-carrier groups, each first-level sub-carrier group includes N second-level sub-carrier groups, and each spatial flow corresponds to at least one sub-carrier in at least one second-level sub-carrier group of each first-level sub-carrier group, where K is a positive integer. For this implementation manner, refer to a structure shown in FIG. 4.

In still another implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field may be specifically: all the spatial flows are divided into $$\frac{N}{M}$$

groups, where each group includes M spatial flows, and the groups of spatial flows are respectively mapped to the $$\frac{N}{M}$$

sub-carrier arrays of each TSS combination by using an M×M-dimensional spatial flow mapping matrix P. For this implementation manner, refer to a structure shown in FIG. 7.

In yet another optional implementation manner, M is an integer greater than or equal to 2, TSSs, in a same location, of all OFDM symbols in the second part of the training field constitute one TSS combination, each TSS combination includes $$\frac{N}{M}$$

sub-carrier arrays, and the sub-carrier array includes M sub-carriers in a time domain direction and includes at least one sub-carrier in a frequency domain direction. That each spatial flow corresponds to at least one sub-carrier in each TSS of each OFDM symbol in the second part of the training field includes: all the spatial flows are divided into $$\frac{N}{M}$$

groups, where each group includes M spatial flows, and the M spatial flows each correspond to at least one sub-carrier in at least one sub-carrier array of each TSS combination. For this implementation manner, refer to a structure shown in FIG. 8.

Further, when the value of M is a positive integer greater than 1, for OFDM symbols in the second part of the training field, correspondences between a sub-carrier group and a spatial flow are the same or different. Specifically, if the correspondences are the same, it may be understood that structures of the OFDM symbols in the second part of the training field are the same, for example, the structures shown in FIG. 3 or FIG. 4; or if the correspondences are different, refer to FIG. 5.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A signal processing apparatus for use in a multi-user multiple-input multiple-output (MU-MIMO) system, the apparatus comprising:
    a processor; and
    a non-transitory computer-readable storage medium coupled to the processor and storing programming instructions which, when executed by the processor, cause the processor to:

receive a signal comprising N spatial flows, wherein the signal comprises a training field comprising a first part and a second part, wherein the first part of the training field comprises L orthogonal frequency division multiplexing (OFDM) symbols, $L \leq N$, N is a positive integer, sub-carriers of the OFDM symbol in the first part of the training field are divided into N training sub-carrier sets (TSSs), each spatial flow corresponds to one TSS in each OFDM symbol in the first part of the training field, and each spatial flow corresponds to TSSs at different frequency domain locations in different OFDM symbols in the first part of the training field, and wherein the second part of the training field comprises M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of the OFDM symbol in the second part of the training field;

determine, for each spatial flow in the signal received, a phase correction factor corresponding to the spatial flow; and perform phase correction on channel estimation of the spatial flow by using the phase correction factor, to obtain phase-corrected channel estimation of each spatial flow.

2. The apparatus according to claim 1, wherein in the OFDM symbol in the second part of the training field, each TSS comprises N sub-carrier groups, and each spatial flow corresponds to at least one sub-carrier in at least one sub-carrier group of each TSS.

3. The apparatus according to claim 1, wherein in the OFDM symbol in the second part of the training field, each TSS comprises D levels of sub-carrier groups, wherein D is a positive integer greater than or equal to 2; and a $(D-1)^{th}$-level sub-carrier group comprises at least two $D^{th}$-level sub-carrier groups, the $D^{th}$-level sub-carrier group comprises at least N sub-carriers, and each spatial flow corresponds to at least one sub-carrier in at least one $D^{th}$-level sub-carrier group comprised in each $(D-1)^{th}$-level sub-carrier group.

4. The apparatus according to claim 3, wherein:
a value of M is 1 and a value of D is 2; and
in the OFDM symbol in the second part of the training field, each TSS comprises K first-level sub-carrier groups, each first-level sub-carrier group comprises N second-level sub-carrier groups, and each spatial flow corresponds to at least one sub-carrier in at least one second-level sub-carrier group of each first-level sub-carrier group, wherein K is a positive integer.

5. A signal processing method for use in a multi-user multiple-input multiple-output (MU-MIMO) system, and the method comprising:

receiving a signal comprising N spatial flows, wherein the signal comprises a training field comprising a first part and a second part, wherein the first part of the training field comprises L orthogonal frequency division multiplexing (OFDM) symbols, $L \leq N$, N is a positive integer, sub-carriers of the OFDM symbol in the first part of the training field are divided into N training sub-carrier sets (TSSs), each spatial flow corresponds to one TSS in each OFDM symbol in the first part of the training field, and each spatial flow corresponds to TSSs at different frequency domain locations in different OFDM symbols in the first part of the training field, and wherein the second part of the training field comprises M OFDM symbols, sub-carriers of the OFDM symbol in the second part of the training field are divided into N TSSs in a division manner that is the same as a division manner of the sub-carriers of the OFDM symbol in the first part of the training field, and each spatial flow corresponds to at least one sub-carrier in each TSS of each OFDM symbol in the second part of the training field;

determining, for each spatial flow, a phase correction factor corresponding to the spatial flow; and performing, by using the phase correction factor, phase correction on channel estimation of the spatial flow corresponding to the phase correction factor, to obtain phase-corrected channel estimation of each spatial flow.

6. The method according to claim 5, wherein in the OFDM symbol in the second part of the training field, each TSS comprises N sub-carrier groups, and each spatial flow corresponds to at least one sub-carrier in at least one sub-carrier group of each TSS.

7. The method according to claim 5, wherein in the OFDM symbol in the second part of the training field, each TSS comprises D levels of sub-carrier groups, wherein D is a positive integer greater than or equal to 2; and a $(D-1)^{th}$-level sub-carrier group comprises at least two $D^{th}$-level sub-carrier groups, the $D^{th}$-level sub-carrier group comprises at least N sub-carriers, and each spatial flow corresponds to at least one sub-carrier in at least one $D^{th}$-level sub-carrier group comprised in each $(D-1)^{th}$-level sub-carrier group.

8. The method according to claim 7, wherein:
a value of M is 1 and a value of D is 2; and
in the OFDM symbol in the second part of the training field, each TSS comprises K first-level sub-carrier groups, each first-level sub-carrier group comprises N second-level sub-carrier groups, and each spatial flow corresponds to at least one sub-carrier in at least one second-level sub-carrier group of each first-level sub-carrier group, wherein K is a positive integer.

\* \* \* \* \*